United States Patent [19]

Lammers et al.

[11] Patent Number: 5,084,121
[45] Date of Patent: Jan. 28, 1992

[54] METHOD OF MAKING FIBRILLATED TAPE

[75] Inventors: William D. Lammers, Cottage Grove; Ronald P. Leseman, Newport, both of Minn.

[73] Assignee: Minnesota Mining and Manufacturing Company, St. Paul, Minn.

[21] Appl. No.: 582,530

[22] Filed: Oct. 15, 1990

Related U.S. Application Data

[62] Division of Ser. No. 228,391, Aug. 4, 1988, Pat. No. 4,973,517.

[51] Int. Cl.$^5$ .............................. B29C 47/06
[52] U.S. Cl. ........................... 156/243; 156/244.11; 156/244.18; 156/244.23; 156/244.24; 428/343; 428/354; 428/355; 428/910
[58] Field of Search ............ 156/244.11, 244.23, 156/244.24, 244.18, 243; 264/DIG. 47; 428/343, 354, 355, 910

[56] References Cited

U.S. PATENT DOCUMENTS

| Re. 32,171 | 6/1986 | van Turnbout | 55/155 |
|---|---|---|---|
| 2,750,315 | 6/1956 | Tierney | 428/295 |
| 3,118,534 | 1/1964 | Groff et al. | 156/244.23 |
| 3,137,746 | 6/1964 | Seymour et al. | 264/DIG. 47 |
| 3,384,531 | 5/1968 | Parrish | 428/314.2 |
| 3,705,070 | 12/1972 | Kim | 156/173 |
| 3,739,053 | 6/1973 | Yazawa | 264/154 |
| 3,783,093 | 1/1974 | Gallacher | 264/210 |
| 3,851,034 | 11/1974 | Harmon et al. | 264/147 |
| 3,894,904 | 7/1975 | Cook | 264/DIG. 47 |
| 3,991,754 | 11/1976 | Gertzman | 128/156 |
| 4,379,806 | 4/1983 | Korpman | 156/244.11 |
| 4,594,210 | 6/1986 | Vittone et al. | 264/70 |
| 4,636,427 | 1/1987 | Ohno et al. | 428/246 |
| 4,654,254 | 3/1987 | Gerry et al. | 428/252 |
| 4,705,715 | 11/1987 | DeCoste et al. | 156/244.11 |
| 4,818,610 | 4/1989 | Zimmerman et al. | 428/345 |

OTHER PUBLICATIONS

Reichstadter and Sevick, *Production and Application of Polypropylene Textiles*, Elsevier Scientific Publishing Company (Amsterdam 1983), pp. 222–223.

*Primary Examiner*—Caleb Weston
*Attorney, Agent, or Firm*—Gary L. Griswold; Walter N. Kirn; David L. Weinstein

[57] ABSTRACT

Pressure-sensitive adhesive tape comprising a backing, layer of fibrillated, polymeric film adhered to at least one major surface of said backing, and a layer of pressure-sensitive adhesive applied to the major surface of said layer of said fibrillated, polymeric film not facing said backing. A method for manufacturing the aforementioned pressure-sensitive adhesive tape is also provided.

The tape of this invention can be made to have a tensile strength in excess of 100 lbs/in and cross-direction tear resistance in excess of 11 lbs/in.

4 Claims, 2 Drawing Sheets

METHOD OF MAKING FIBRILLATED TAPE

This is a division of application Ser. No. 228,391, filed Aug. 4, 1988, now U.S. Pat. No. 4,973,517.

BACKGROUND OF THE INVENTION

1. Field of the Invention

This invention relates to a pressure-sensitive adhesive tape and a method for making same.

2. Discussion of the prior art

Filament-reinforced tapes have been found to be useful for strapping applications, such as, for example, in the areas of packaging and bundling. Filament-reinforced tapes generally comprise a backing having adhered to one major surface thereof a plurality of yarns, which comprise a multiplicity of glass or synthetic polymeric filaments, by means of an adhesive. Alternatively, the yarns can be replaced by individual filaments. Typically, a layer of pressure-sensitive adhesive is then applied over the yarn- or filament-bearing surface of the tape. Filament tapes can be made by applying continuous filaments or yarns drawn from warp beams or spools to a substrate, e.g. a film or paper backing. U.S. Pat. No. 2,750,315 discloses a process in which a film or paper backing is first coated with an adhesive solution and then dried sufficiently to remove the bulk of the solvent. Then, synthetic polymeric yarns are laminated to the backing. The yarn-bearing backing is then coated with a second adhesive solution and then dried again. The finished tape is then wound into a jumbo roll, slit, and wound into tape rolls in a conventional manner. This method is also applicable to untwisted mono-fiber filaments. During all of these steps, many problems can occur. One of the most common problems is breakage of the filaments from the warp beams during the lamination step. Much time must be spent during initial set-up to thread the individual yarns from the warp beam into the yarn combs in order to provide proper alignment of yarns during the laminating step. The processing of hundreds of yarns, which are very fragile, is difficult. Selection of optimum process conditions, such as yarn tension, adhesive coating, and lamination, is critical to minimize waste and rework. Another problem is compatibility of the adhesive systems with the yarns of the tape. Although the adhesive does surround the individual yarns which are comprised of bundles of filaments, it does not coat each individual filament. This can result in poor bond between the adhesive and the surface of the filament.

Although filament-reinforced tapes are extremely useful, the cost of making them is high because of the high cost of filaments and the high cost of processing. In order to reduce the cost of making filament-reinforced tapes, some manufacturers have resorted to reducing the number of filaments adhered to the backing. However, this expedient reduces the tear strength of the tape.

While high quality filament-reinforced tapes are known to have an extremely high level of tear strength, they are generally used only once, thus making their use costly to the consumer. It is therefore desired to have a tape having a reasonably high level of tear strength, but at a much lower cost than that of high quality filament-reinforced tapes.

SUMMARY OF THE INVENTION

In one aspect, this invention provides a pressure-sensitive adhesive tape comprising a backing, a layer of fibrillated, polymeric film adhered to at least one major surface of said backing, and a layer of pressure-sensitive adhesive applied over the surface of said layer of fibrillated, polymeric film not facing said backing Preferably, the fibrillated, polymeric film is also oriented in the machine direction.

In another aspect, this invention provides a

In another aspect, this invention provides a method for manufacturing said pressure-sensitive adhesive tape comprising the steps of:

(1) providing a backing bearing a layer of a first adhesive on one major surface thereof,
(2) providing a layer of fibrillated, polymeric film,
(3) adhering said layer of fibrillated, polymeric film to said backing by means of said first adhesive layer, and
(4) applying a layer of adhesive over the major surface of said layer of fibrillated, polymeric film not facing said backing.

The tape of this invention has an appearance similar to that of a filament-reinforced tape. The tape of this invention has a cross-direction tear resistance exceeding that of flat tape. The tape of this invention can have a tensile strength in excess of 100 lbs/in and cross-direction tear resistance in excess of 11 lbs/in.

DETAILED DESCRIPTION

Figure 1:
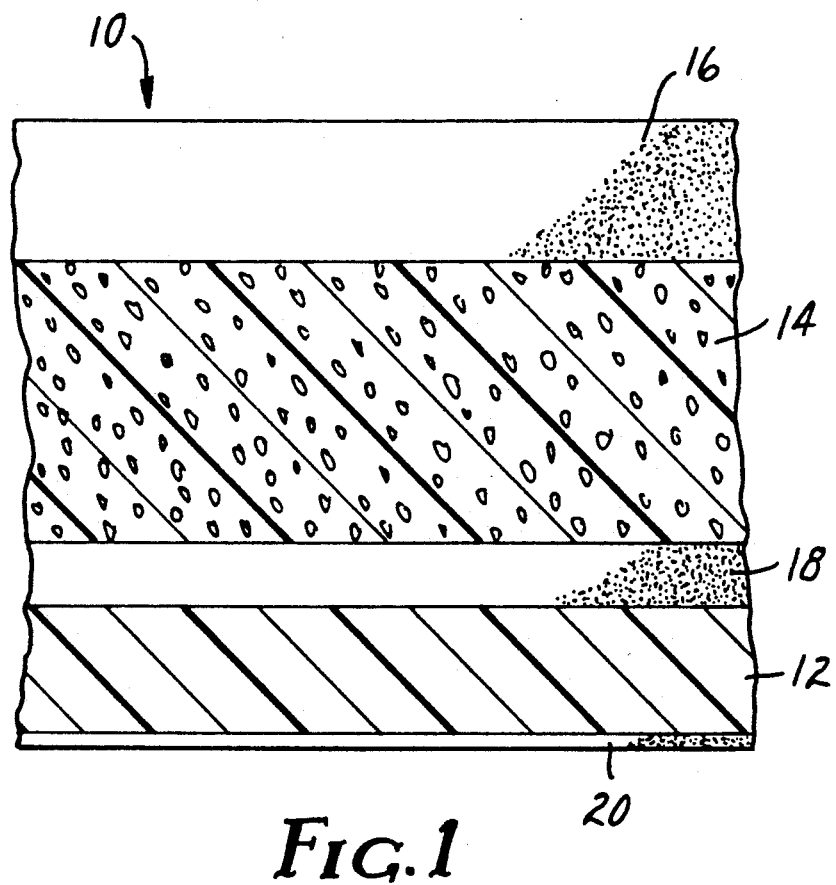
FIG. 1 is a cross-sectional view of the pressure-sensitive adhesive tape of the present invention.

The tape 10 of this invention comprises a backing 12, a layer of fibrillated, polymeric film 14 adhered to at least one major surface of backing 12, and a layer of pressure-sensitive adhesive 16 applied over the surface of said layer of fibrillated, polymeric film 14 that is not facing backing 12.

Backing 12 can be selected from materials conventionally used to prepare backings for pressure-sensitive adhesive tapes. Preferably, backing 12 is prepared from a biaxially oriented polymeric film. Suitable materials for backing 12 include, but are not limited to, polyamides, polyesters, and polyolefins. A preferred material for backing 12 is biaxially oriented polypropylene, the reasons being low cost and ease of processing. The thickness of backing 12 can vary, but preferably, the thickness of backing 12 ranges from about 0.0005 to about 0.05 in.

Polymeric film 14 can be prepared from polymers that are thermoplastic and extrudable. Suitable materials for polymeric film 14 include polyamides, polyesters, and polyolefins. The preferred material for polymeric film 14 is polypropylene, for the reason that it exhibits good processability, low cost, and a high degree of molecular orientation when stretched at temperatures below the melting point and above the glass transition temperature of the propylene polymer. The thickness of polymeric film 14 can vary, but preferably, the thickness of polymeric film 14 ranges from about 0.001 to about 0.010 in.

It is preferred that polymeric film 14 be oriented in the machine direction before being fibrillated. Orientation provides improved tensile strength of the film in the machine direction and improves the processability of the film. Orientation of polymeric film is well known, and is described, for example, in Billmeyer, F.W., *The Textbook of Polymer Science*, 2nd ed., John Wiley and Sons (1971), pp. 174-180, incorporated herein by reference. The orientation ratio can vary, but preferably ranges from about 5:1 to about 12:1.

Fibrillation of polymeric films is well-known, and is described, for example, in Reichstadter and Sevick, *Production and Applications of Polypropylene Textiles*, Elsevier Scientific Publishing Company (Amsterdam 1983), pp. 222-225, incorporated herein by reference. The fibrillated film shows, on spreading, a net-like structure comprising fine fibers. The fibers are interconnected without being continuous and parallel. Fibrillation is typically conducted by means of a mechanical fibrillator.

Fibrillated, polymeric film 14 can be bonded to backing 12 by means of a layer of adhesive 18. The preferred adhesive for this purpose is pressure-sensitive adhesive, such as, for example, acrylates, resin-tackified natural rubber adhesives, and tackified block copolymers. Adhesive 18 can also be a heat-activatable adhesive.

The pressure-sensitive adhesive of layer 16 can vary depending on the intended use of tape 10. Suitable classes of pressure-sensitive adhesives for layer 16 of tape 10 of this invention include resin-tackified natural rubber, thermoplastic resins, e.g. acrylates, and tackified block copolymers. These materials are well known and are described, for example, in the *Encyclopedia of Polymer Science and Technology*, Vol. 1, Interscience Publishers New York: (964), pp. 445-450, incorporates herein by reference.

Tape 10 can optionally have a low adhesion backsize layer 20 applied over the surface of backing 12 not facing the layer of fibrillated, polymeric film 14. Low adhesion backsize compounds suitable for layer 20 for use with tape 10 are known to one of ordinary skill in the art and are described, for example, in U.S. Pat. Nos. 2,532,001, 2,607,711, and 3,318,852, all of which are incorporated herein by reference.

Although the number of fibrils per inch of width of tape 10 and the width of the fibrils themselves can vary, in the preferred embodiments of tape 10, the number of fibrils per inch of tape width ranges from about 50 to about 400 and the width of the fibrils ranges from about 50 to about 500 micrometers.

The properties of tape 10 can also vary, but in the preferred embodiments, these properties are as follows:

| Tensile strength | (lb/in): | 50 to 200 |
| --- | --- | --- |
| Tear strength | (lb): | 1 to 50 |
| Elongation | (%): | 5 to 20 |

Tape 10 is similar in appearance to tapes described in U.S. Pat. No. 2,750,315.

Figure 2:
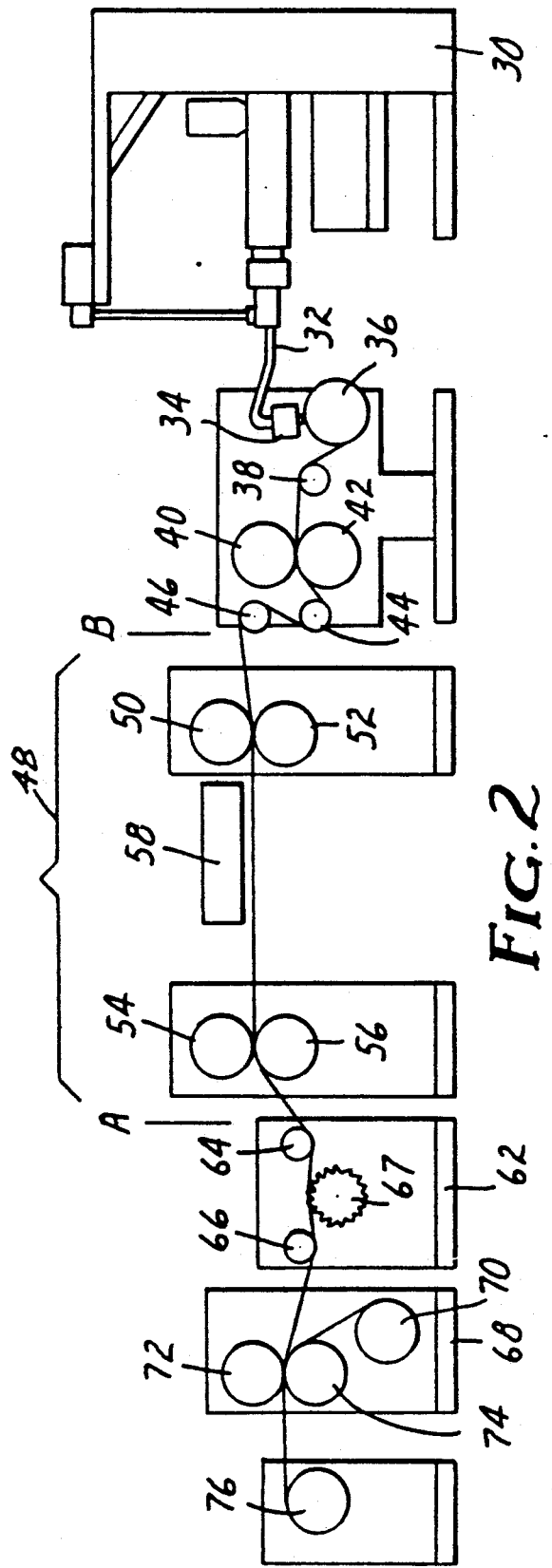
FIG. 2 is a schematic illustration of apparatus useful in the process of preparing the tape of the present invention.
Figure 3:
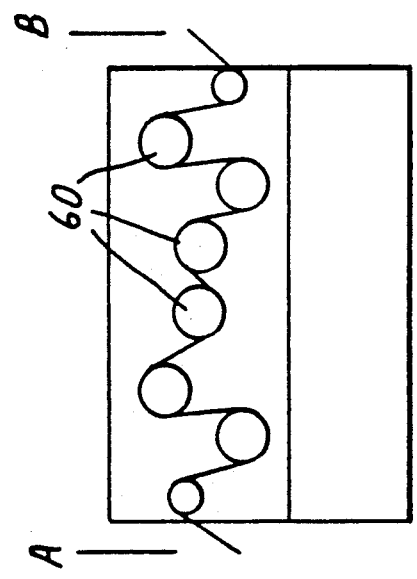
FIG. 3 is a schematic illustration of a segment of an orienter useful in the process of the present invention.

Tape 10 of this invention is preferably made by a continuous process. In the first step of the process, a polymeric material, e.g., polypropylene, is formed into a continuous film of desired thickness. The continuous film is preferably formed by means of an extrusion process. Extrusion processes are well-known in the art and are described, for example, in Rauwendaal, *Polymer Extrusion*, Hanser Publishers (Munich, New York, Vienna: 1986). In FIG. 2, a supply extruder that can be used to mix and melt the polymeric material is designated by the numeral 30. Extruder 30 feeds the molten polymeric material by way of neck tube 32 to die 34, from which die is formed a cast sheet. The cast sheet is then quenched or cooled by means of casting wheel 36. The cast sheet is then guided away from casting wheel 36 by means of a series of rolls consisting of an idler roll 38, pacer rolls 40 and 42, and additional idler rolls 44 and 46. After the cast sheet traverses rolls 38, 40, 42, 44, and 46, the cast sheet is preferably oriented in the machine direction by any apparatus suitable for the task. Although orientation is not necessary, it is preferred because it improves the strength of the film and improves the ability to fibrillate the film. Orientation is preferably carried out by means of drawing in a machine direction orienter 48. Orienter 48 comprises pacer rolls 50 and 52, which are nipped to maintain the sheet at a constant speed, pull rolls 54 and 56, which are nipped and maintained at such a speed so as to cause the sheet to be stretched in the machine direction. A heat source 58 is disposed between pacer rolls 50 and 52 and pull rolls 54 and 56 for the purpose of allowing a high degree of orientation. In an alternative method, drawing can be replaced by hot roll orientation, wherein the cast sheet is pulled over a series of heated rolls 60 (see FIG. 3). The temperature of the heated rolls can vary, depending upon roll speed, film thickness, and polymeric material. For polypropylene, the temperature ranges from about 150 to about 250° F. After the orientation step, the oriented polymeric film is then fibrillated by means of a mechanical fibrillator 62. Fibrillator 62 comprises idler rolls 64 and 66, which support the polymeric film as it is fibrillated by a fibrillator head 67, which contains a plurality of blades for the purpose of cutting the film so as to convert it to a fibrous structure. Fibrillator head 67 can be moved in the vertical direction to obtain the desired degree of fibrillation. Fibrillator head 67 can be moved so as to cut completely through the film or to cut into the film but not to such a degree that the film is cut completely therethrough. Rotational speed can also be varied to control the size of the fibrils. The fibrillated, oriented film can then be laminated to a backing bearing a layer of adhesive on at least one major surface thereof in a laminating station 68. Laminating station 68 comprises a supply roll 70, which provides a backing 12 bearing adhesive layer 16 and low adhesion backsize layer 20 to laminating rolls 72 and 74 through which the fibrillated, polymeric film is also drawn, whereby the fibrillated, polymeric film is laminated to the backing. A winder 76 can then be used to prepare a roll of web material bearing layers 12, 14, 16, and 20. Then a second layer of adhesive 18 can be coated onto the exposed surface of the fibrillated, polymeric film, i.e. the surface that is opposite the low adhesion backsize layer of the backing, off line in a separate operation by means of conventional coating techniques. This layer of adhesive is preferably applied by means of an extrusion coating process. The resulting product can then be slit to tape width and wound prior to storage.

The following, non-limiting examples further illustrate the present invention. In the examples, the following apparatus and conditions were used, except where noted:

Extruder: One-inch Killion Lab Extruder equipped with a 30:1 L/D ratio screw

Die: Six-inch casting die 25 mil orifice opening

Extrusion melt temperature: 475° F.
Temperature of casting wheel: 80° F.
Method of orientation: speed differential between two heated nipped rolls
Heat source: radiant heater placed between nips
Fibrillator: rotating drum with hacksaw blades equally spaced on the circumference thereof
Blade coarseness: 18 teeth per inch

EXAMPLE 1

In this example, the polymeric material from which the fibrillated, polymeric film was derived was formed of 12 MF PP polypropylene, available from Exxon Corporation. The backing was adhesive-coated biaxially oriented polypropylene (#371 "Scotch" brand box sealing tape, available from Minnesota Mining and Manufacturing Company). Polypropylene resin was extruded with a one inch, 30:1 L/D extruder 30. The extrudate formed a flat film as it exited die 34 and the extruded film was quenched on casting wheel 36. The thickness of the cast film was 9 mil. From casting wheel 36, the film was transported to orienter 48, where it was stretched at a ratio of 10.5:1. After leaving orienter 48, the oriented, polymeric film was fibrillated by means of mechanical fibrillator 62. The blades of the fibrillator cut completely through the film during the fibrillation step. This type of fibrillation is often referred to as total fibrillation. This type of fibrillation was also employed in Examples 2, 3, 4, and 5. The thus fibrillated, oriented, polymeric film was laminated to a backing which bore a layer of adhesive on the surface to which the fibrillated, oriented, polymeric film was laminated. A layer of pressure-sensitive adhesive was applied over the surface of the fibrillated, oriented, polymeric film not facing the backing. The properties of the tape of this example are shown in Table I.

Tear strength was determined according to a modification of ASTM D1004-66 (Reapproved 1981). All testing conditions were the same as in the ASTM test except that Sections 4.3, 5.1-5.5 and 8.1 of the test were not used. The major reason was that the samples for testing were only one inch in width and varied in caliper.

The samples actually tested were 4.0 inches in length by 1.0 inch in width, the 4.0 inch length being in the machine direction and the 1.0 inch width being in the cross direction.

Prior to placement into the jaws of an "Instron" tensile tester, the samples were measured to a length of four inches, then a nick (¼ inch in length) was cut with a razor blade into one side of the one inch wide sample at the center of the 4.0 inch dimension. A ⅜ inch portion remained for cross direction testing. Insertion of the specimen into the jaws of the "Instron" tensile tester was accomplished by offsetting the four inch long sample at 15° angles to the vertical plane of the upper and lower Instron jaws. By offsetting the sample in this manner, all of the stress was placed on the side of the sample having the ¼ inch cut and the sample was forced to tear in the cross direction. The force was recorded on the "Instron" chart recorder in pounds as it was being measured. Three samples of each tape were tested. The average of each response as measued by the chart recorder were documented as the pounds force required to tear the sample.

EXAMPLE 2

In this example, the polymeric material from which the fibrillated, oriented, polymeric film was derived was formed of 2.5 MF PP polypropylene, available from Exxon Corporation. The procedure described in Example 1 was used to form the tape of this example. The only exceptions were that the thickness of the cast film was 5 mil and that the stretch ratio was decreased to 5.7:1. The thickness of the oriented film was 1.8 mil. The properties of the tape of this example are shown in Table I.

EXAMPLE 3

In this example, the polymeric material from which the fibrillated, oriented, polymeric film was derived was formed of 12 MF PP polypropylene, available from Exxon Corporation. The procedure described in Example 1 was repeated, the only exceptions being that the stretch ratio was decreased to 8.6:1. The thickness of the oriented film was 2.8 mil. The properties of the tape of this example are shown in Table I.

EXAMPLE 4

In this example, the polymeric material from which the fibrillated, oriented, polymeric film was derived was formed of 12 MF PP polypropylene, available from Exxon Corporation. The procedure described in Example 1 was repeated, the only exceptions being that orientation was carried out by means of the apparatus set forth in FIG. 3 and the stretch ratio was decreased to 8.5:1. The thickness of the cast film was 10 mil. The properties of the tape of this example are shown in Table I.

EXAMPLE 5

In this example, the fibrillated, oriented, polymeric film was derived from a blend of 90% polyethylene terephthalate and 10% polypropylene. The procedure described in Example 1 was used to form the tape of this example, the only exceptions being that the cast film had a thickness of 5 mil and that the stretch ratio was decreased to 5:1. The properties of the tape of this example are shown in Table I.

EXAMPLE 6

In this example, the polymeric material from which the fibrillated, oriented polymeric film was derived was formed of 12 MF PP polypropylene, available from Exxon Corporation. The procedure described in Example 1 was used to form the tape of this example, the only exceptions being that the cast film had a thickness of 10 mil, the stretch ratio was decreased to 9:1, and the blades of the fibrillator did not cut completely through the film during the fibrillation step, but only cut below the surface of the film. This type of fibrillation is often referred to as a partial fibrillation. The properties of the tape of this example are shown in Table I.

TABLE I

| Example no. | Thickness of cast film (mil) | Thickness of oriented film (mil) | Stretch ratio | Fibril width (micrometer) | Fibrils per inch | Tensile at break (lb/in) | Tear strength (lb) | Elongation (%) |
| --- | --- | --- | --- | --- | --- | --- | --- | --- |
| 1 | 9.00 | 2.00-2.50 | 10:1 | NM | NM | 103.5 | 17.7 | 9.5 |
| 2 | 5.00 | 1.70-2.00 | 5.7:1 | NM | NM | 61.0 | 11.7 | 18.0 |

TABLE I-continued

| Example no. | Thickness of cast film (mil) | Thickness of oriented film (mil) | Stretch ratio | Fibril width (micrometer) | Fibrils per inch | Tensile at break (lb/in) | Tear strength (lb) | Elongation (%) |
| --- | --- | --- | --- | --- | --- | --- | --- | --- |
| 3 | 9.20 | 2.80 | 8.6:1 | 200 | 123 | 112.5 | 33.0 | 8.0 |
| 4 | 10.00 | NM* | 8.5:1 | 171 | 140 | 80.0 | 12.3 | 9.0 |
| 5 | 5.00 | NM | 5:1 | 176 | 95 | 45.7 | 10.7 | 12.0 |
| 6 | 10.00 | 1.80 | 9:1 | 180 | 118 | 149.0 | 32.3 | 9.0 |

*NM means not measured.

EXAMPLE 7

In this example, the polymeric material from which the fibrillated, oriented, polymeric film was derived was formed of 12 MF PP polypropylene, available from Exxon Corporation. The procedure described in Example 1 was used to form the tape of this example. The only exceptions were that the film was cast at a thickness of 10 mil and then oriented with a hot roll orienter at a stretch ratio of 9:1.

Fibrillation was conducted in two ways:
(1) completely through the web (total fibrillation);
(2) barely contacting the surface of the web (partial fibrillation).

The properties of the tape of this example are shown in Table II.

TABLE II

| | Fibril width (micrometer) | Fibrils per inch | Tensile at break (lb/in) | Tear strength (lb) | Elongation (%) |
| --- | --- | --- | --- | --- | --- |
| Not fibrillated | — | — | 98.8 | 8.6 | — |
| Partially fibrillated | 325 | 73 | 88.5 | 12.0 | 10 |
| Totally fibrillated | 207 | 101 | 41.3 | 9.3 | 9 |

From the foregoing results, it can be seen that the fibrillated structure had improved tape cross web tear resistance. Fiber width was increased when contact only fibrillation was used. Partial fibrillation produced a tape having higher tensile values than did total fibrillation.

Various modifications and alterations of the invention will be apparent to those skilled in the art without departing from the cope and spirit of this invention, and it should be understood that this invention is not to be unduly limited to the illustrative embodiments set forth herein.

What is claimed is:

1. Method for preparing a pressure-sensitive adhesive tape comprising a backing bearing on at least one major surface thereof a layer of a fibrillated, polymeric film, said film layer bearing a layer of pressure-sensitive adhesive on the major surface thereof not facing said backing, said method comprising the steps of:
   (a) providing a backing bearing a layer of a first adhesive on at least one major surface thereof,
   (b) providing a layer of fibrillated, polymeric film, said film being oriented in the machine direction,
   (c) adhering said layer of fibrillated, oriented polymeric film to said backing by means of said layer of first adhesive, and
   (d) applying a layer of pressure-sensitive adhesive over the major surface of said layer of fibrillated, oriented polymeric film not facing said backing.

2. The method of claim 1 wherein said fibrillated polymeric film has been oriented prior to being fibrillated.

3. The method of claim 2 wherein said fibrillated polymeric film has been extruded prior to being oriented and fibrillated.

4. The method of claim 1 wherein said layer of pressure-sensitive adhesive is applied by means of an extrusion coating process.

* * * * *

UNITED STATES PATENT AND TRADEMARK OFFICE
CERTIFICATE OF CORRECTION

PATENT NO. : 5,084,121
DATED : January 28, 1992
INVENTOR(S) : Lammers et al.

It is certified that error appears in the above-indentified patent and that said Letters Patent is hereby corrected as shown below:

Col. 5, line 50, "¾" should be --¼--.

Signed and Sealed this

Fourth Day of April, 1995

Attest:

BRUCE LEHMAN

*Attesting Officer*　　　*Commissioner of Patents and Trademarks*